United States Patent
Tung et al.

(10) Patent No.: US 7,688,053 B2
(45) Date of Patent: Mar. 30, 2010

(54) VARIABLE VOLTAGE REGULATING DEVICE

(75) Inventors: Chun-Chin Tung, Chupei (TW); Yung-Lieh Chien, Chupei (TW); Ming Sheng Chen, Chupei (TW)

(73) Assignees: Syspotek Corporation, Chupei (TW); Antig Technology Corporation, Grand Cayman (KY)

( * ) Notice: Subject to any disclaimer, the term of this patent is extended or adjusted under 35 U.S.C. 154(b) by 368 days.

(21) Appl. No.: 11/854,730

(22) Filed: Sep. 13, 2007

(65) Prior Publication Data

US 2008/0067987 A1 Mar. 20, 2008

(30) Foreign Application Priority Data

Sep. 15, 2006 (TW) .............................. 95134127 A

(51) Int. Cl.
*G05F 1/40* (2006.01)
(52) U.S. Cl. ...................................... 323/283
(58) Field of Classification Search ................. 323/265, 323/271, 273, 282, 283, 351
See application file for complete search history.

(56) References Cited

U.S. PATENT DOCUMENTS

| | | | | |
|---|---|---|---|---|
| 5,397,976 A | * | 3/1995 | Madden et al. | ............. 323/222 |
| 6,066,943 A | * | 5/2000 | Hastings et al. | ............. 323/285 |
| 6,940,189 B2 | * | 9/2005 | Gizara | ........................ 307/151 |
| 2007/0210772 A1 | * | 9/2007 | Sawtell | ........................ 323/282 |
| 2008/0157740 A1 | * | 7/2008 | Gurcan | ........................ 323/283 |

* cited by examiner

*Primary Examiner*—Adolf Berhane

(57) ABSTRACT

The present invention relates to a variable voltage regulating device for modulating output voltage, comprising the implementation means of duty cycle modulation and control signal modulation. The duty cycle modulation mechanism entails the use of pulse signals with different duty cycles to produce different voltage signals in the resistor-capacitor network, which are regulated to obtain a control voltage. The original output voltage is then modulated by the control signal and the resistor network based on the Kirchhoff's current law to produce a new output voltage. The control signal modulation mechanism uses the field effect transistor switch to control the resistor network and then uses the resistor network and the Kirchhoff's current law to modulate the original output voltage and deliver a new output voltage.

12 Claims, 4 Drawing Sheets

VARIABLE VOLTAGE REGULATING DEVICE

FIELD OF THE INVENTION

The present invention relates to a variable voltage regulating device for the modulation and regulation of output voltage that can switch between multiple output voltages and provides two different means to achieve the purpose. One embodiment is characterized by adjusting the duty cycle of pulse signal only to linearly modulate the output voltage; another embodiment is characterized by controlling the field effect transistor to achieve the purpose of output voltage modulation.

BACKGROUND OF THE INVENTION

Today's electronic circuit technology typically involves reciprocal support among varying systems and modules to achieve greater functional sophistication, work efficiency and functional versatility. But different systems and modules may not have the same operating voltage. Some special systems or modules must step up or step down the voltage to achieve specific purpose. The voltage modulation technology disclosed in this invention is able to easily modulate voltage for use in various systems and modules. In addition, the invention is able to perform linear voltage modulation and multi-voltage selective modulation. It is an efficient and flexible voltage modulation approach that is not confined to single voltage modulation.

To address the drawback of prior output voltage modulation methods, the invention aims to provide an efficient and convenient voltage modulation method.

SUMMARY OF THE INVENTION

The present invention is applied in the modulation of the output voltage of certain system or module that allows the linkage of different systems or modules by varying the output voltage level with ease.

Another object of the present invention is to alter the output voltage by changing the duty cycle of modulated signal in a linear manner to allow efficient and direct modulation of voltage to be output.

Yet another object of the present invention is to use the transistor switch to change the voltage-dividing circuit configuration and achieve the purpose of output voltage modulation.

A circuit apparatus for modulation of output voltage is disclosed, which comprises a duty cycle modulation mechanism consisting of at least a pulse signal input, a filter, a voltage follower (or called "buffer amplifier"), and a voltage-dividing circuit, wherein the input of pulse signals generates different control voltage signals through the adjustment of duty cycle and the work of filter. After the control signals are regulated by voltage follower, modulation of the original output voltage level is carried out using the voltage-dividing circuit and a fixed reference voltage.

The resistance of the voltage-dividing circuit may be designated by the designer to achieve modulation within different voltage ranges. The aforesaid pulse signal can directly influence the modulation of output voltage by changing its duty cycle, thereby possessing the characteristic of linear modulation.

The voltage modulation mechanism further uses transistor switch to control the resistor distribution in the resistance modulation circuit and then uses the varying resistor distribution to obtain different modulated voltages. The transistor switch is controlled by a controller.

The transistor switch controls the voltage modulation mechanism. The resistance is also adjustable at the discretion of the designer. Also, in view of the voltage output desired, additional resistor divider and its control transistor may be used to add to the flexibility of output voltage modulation.

The object, features and functions of the invention are described in detail with examples and accompanying drawings below.

DETAILED DESCRIPTION OF THE INVENTION

Figure 1:
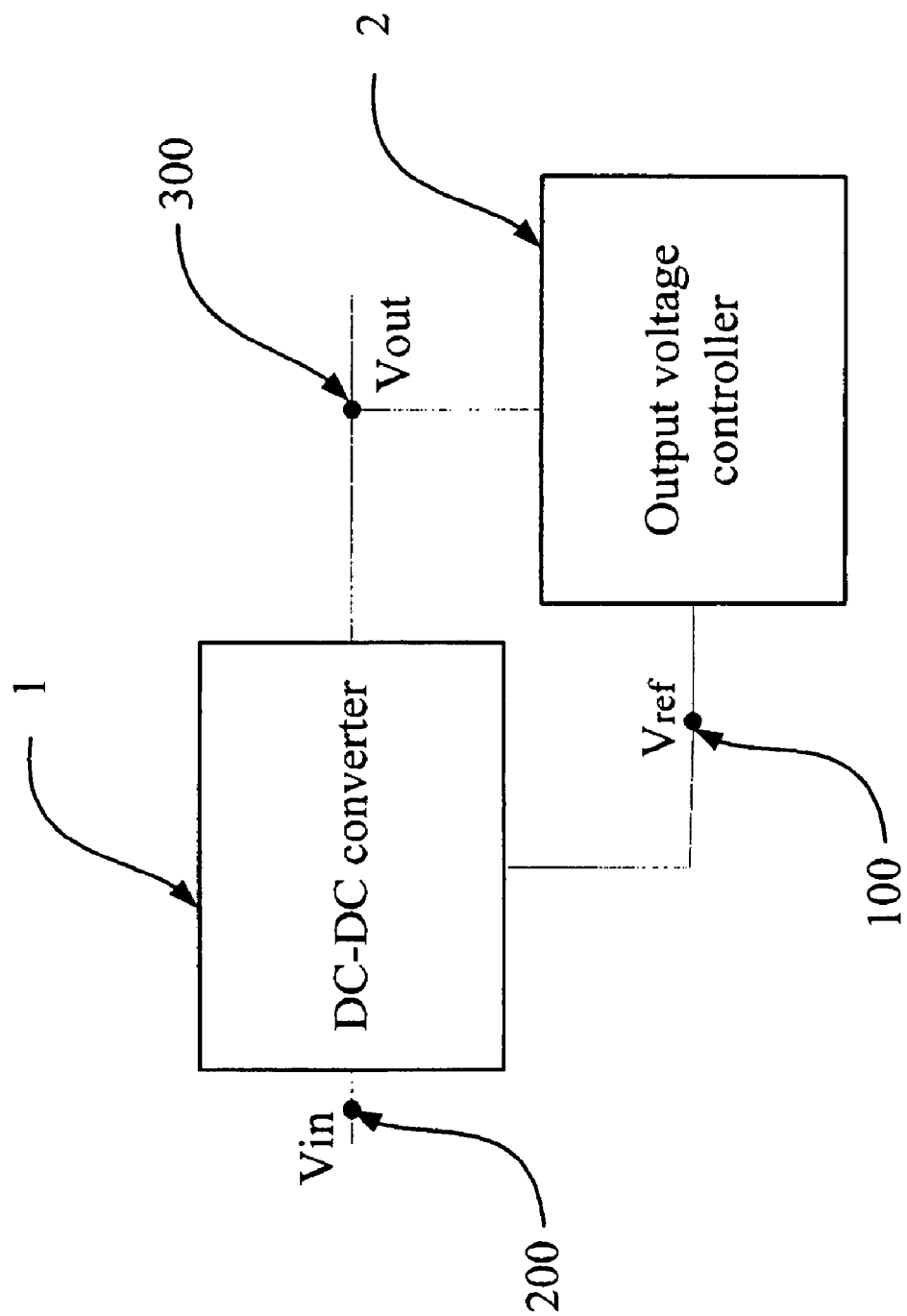
FIG. 1 is a component diagram of the variable voltage regulating device of the invention.

Referring to FIG. 1 which shows a component diagram of the variable voltage regulating device of the invention, the variable voltage regulating device of the invention comprises primarily a DC-DC converter (1) electrically connected to an output voltage controller (2) to achieve a variable DC voltage conversion mechanism. The output voltage controller (2) has a reference voltage terminal (100) and an output voltage terminal (300). The reference voltage terminal (100) employs the means of inputting a modulated DC bias or altering its dividing resistance with a switch mechanism to regulate an input power with input voltage Vin fed from the input voltage terminal (100) of DC-DC converter (1) and deliver an output power with output voltage Vout, which is then output by the output voltage terminal (300).

The DC-DC converter (1) consists of mainly a controller made of integrated circuits coupled with an inductor or a diode. But because boost and buck have different circuitries, the invention only illustrates the three essential terminal components of the DC-DC converter (1), i.e. input voltage terminal (200), output voltage terminal (300), and reference voltage terminal (100) to emphasize and simplify the operation of voltage modulation.

Figure 2:
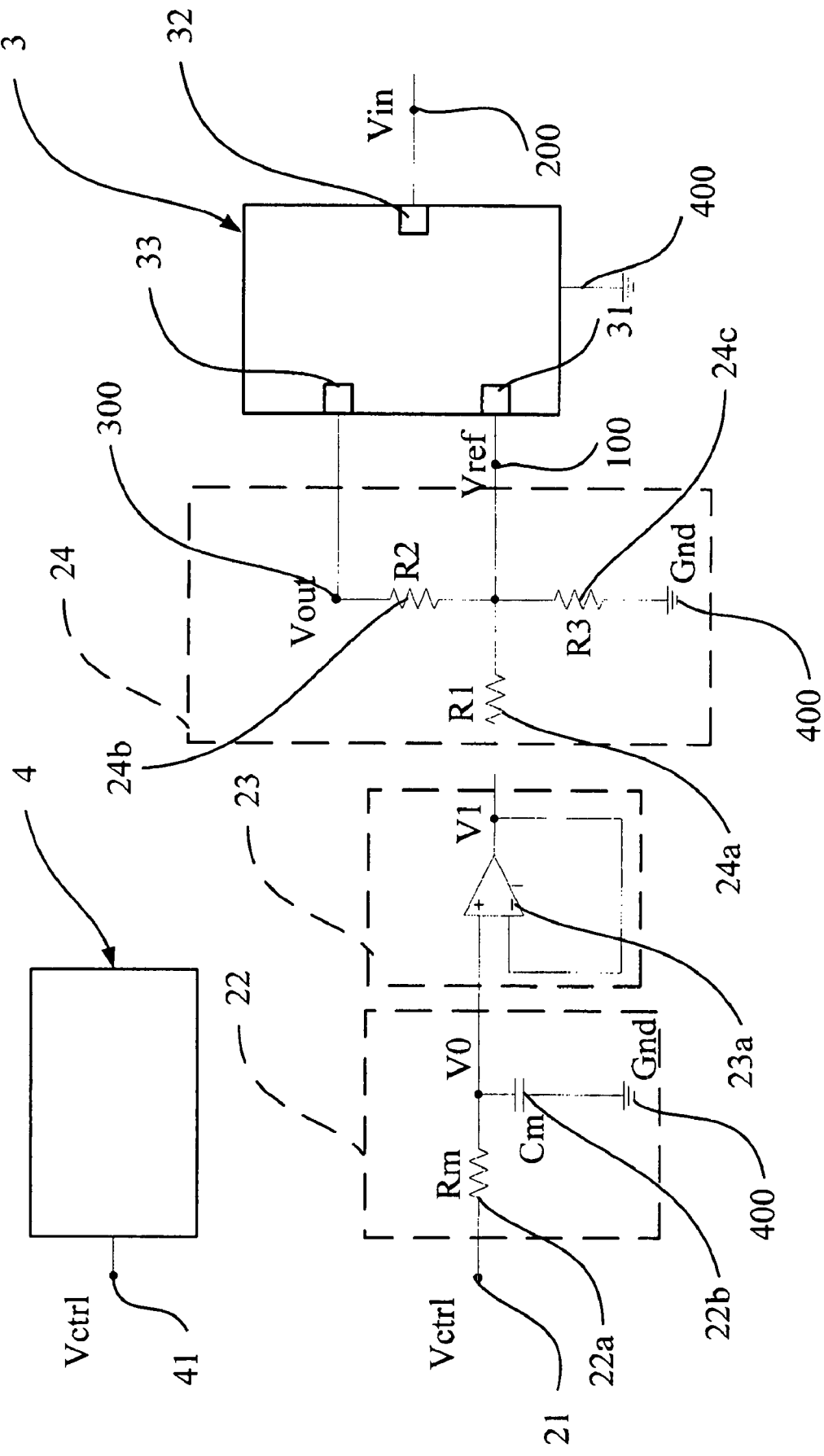
FIG. 2 is a component diagram of the variable voltage regulating device according to an embodiment of the invention.

Referring to FIG. 2 which shows a component diagram of the variable voltage regulating device according to an embodiment of the invention, the DC-DC converter (1) is a direct-current voltage converter, e.g. boost converter or buck converter. The output voltage controller (2) further comprises a pulse signal input terminal (21), a filter (22), a voltage follower (23), and a voltage-dividing circuit (24). The pulse signal input terminal (21) is electrically connected to the filter (22). The filter (22) is electrically connected to the voltage follower (23). The voltage follower (23) is electrically connected to the voltage-dividing circuit (24). The voltage-dividing circuit (24) consists of the reference voltage terminal (100), the output voltage terminal (300) and a ground terminal (400) to enable a continuous pulse signal Vctl fed from the pulse signal input terminal (21) to pass through the filter (22), the voltage follower (23) and the voltage-dividing circuit (24), and output by the output voltage terminal (300) as an electric signal with output voltage Vout.

In the variable voltage regulating device, the pulse signal input terminal (21) is for the input of a continuous pulse signal Vctl; the filter (22) regulates the continuous pulse signal Vctl with specific duty cycle into a signal with specific voltage V0, and the filter (22) is a circuit with resistance-capacitance effect composed of a resistor (22a) with resistance Rm and a capacitor (22b) with capacitance Cm such that one end of the resistor (22a) is electrically connected to the pulse signal input terminal (21) and its other end is simultaneously electrically connected to one end of the capacitor (22b) and the voltage follower (23). The other end of the capacitor (22b) is electrically connected to the ground terminal (400). The voltage follower (23) contains an operational amplifier (23a). The high-potential end of the operational amplifier (23a) is electrically connected to the resistor (22a), while its low-potential end is electrically connected to its output end to achieve a state of negative feedback and enable a voltage V1 output by the output end of operational amplifier (23a) to have the same average value as the voltage V0 input from the high-potential end of operational amplifier (23a), only the voltage signal V1 is steadier than voltage signal V0. The voltage-dividing circuit (24) comprises a first resistor divider (24a), a second resistor divider (24b) and a third resistor divider (24c). The resistance of first resistor divider (24a), second resistor divider (24b) and third resistor divider (24c) is respectively R1, R2 and R3. One end of the first resistor divider 24a is electrically connected to the output end of the operational amplifier (23a) of the voltage follower (23), while its other end, together with one end of the second resistor divider (24b) and one end of the third resistor divider (24c) are electrically connected to the reference voltage terminal (100). The other end of the third resistor divider (24c) is electrically connected to the ground terminal (400), while the other end of the second resistor divider (24b) is electrically connected to the output voltage terminal (300). The proportional relationships among resistance R1, R2 and R3 may be used to determine the output voltage modulation level and hence may vary depending on needs.

The continuous pulse signal Vctl fed into the pulse signal input terminal (21) could be obtained from the pulse signal output terminal (41) of a microcontroller (4).

The DC-DC converter (1) as shown in FIG. 1 is integrated in an integrated circuit (IC) chip (3). The IC chip (3) is an integrated circuit element comprising a feedback terminal (31), a first port (32) and a second port (33). The feedback terminal (31) is electrically connected to the reference voltage terminal (100), provides a fixed voltage for the output of a signal having the same voltage level as reference voltage Vref such that the reference voltage Vref at the reference voltage terminal (100) is a constant voltage. The first port (32) and the second port (33) are electrically connected to the input voltage terminal (200) and the output voltage terminal (300) respectively.

Figure 3:
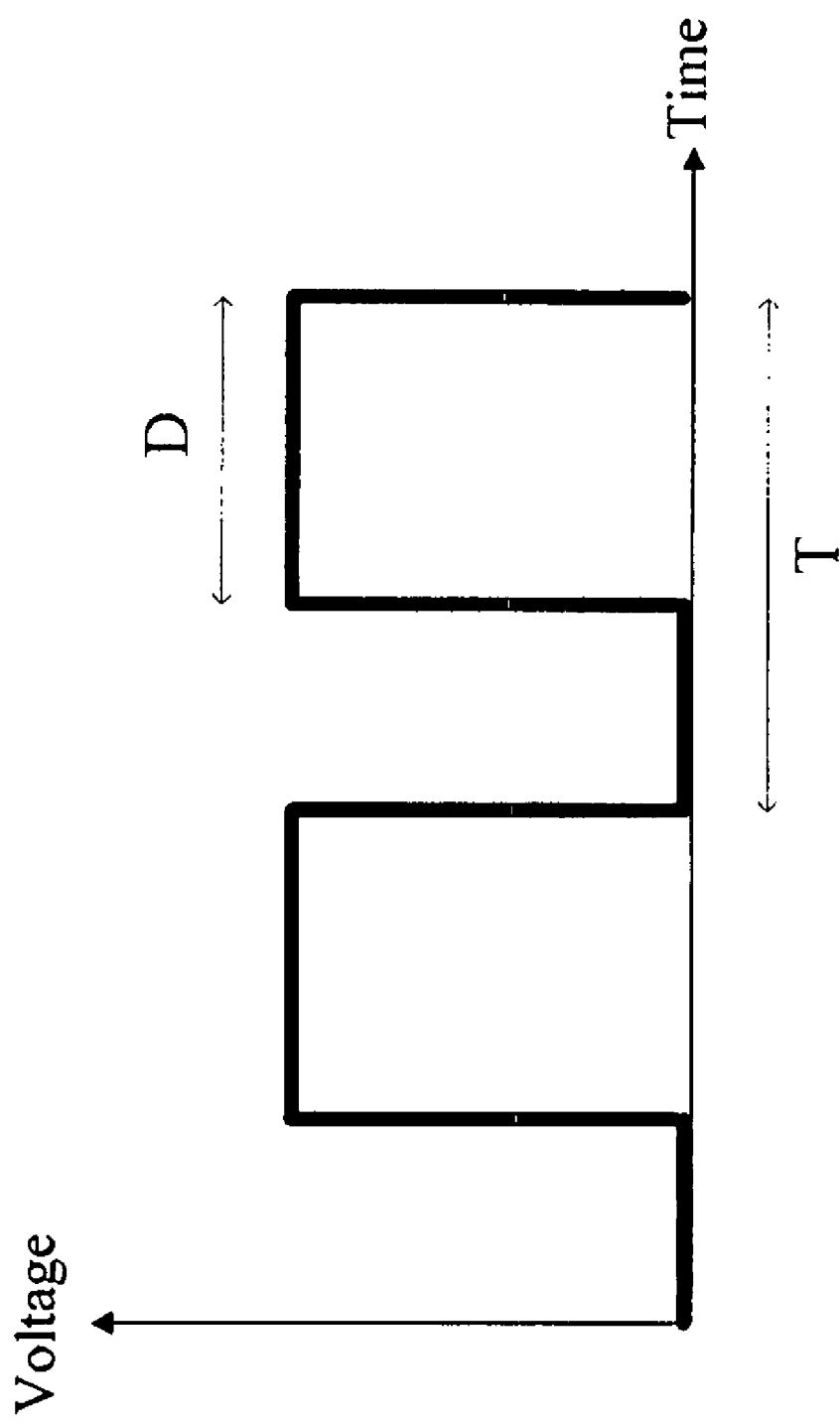
FIG. 3 is a signal diagram at the pulse signal input terminal of the variable voltage regulating device according to an embodiment of the invention.

FIG. 3 shows a signal diagram at the pulse signal input terminal of the variable voltage regulating device according to an embodiment of the invention. Referring to FIG. 2 and FIG. 3, the continuous pulse signal Vctl fed from the pulse signal input terminal (21) would produce an approximate constant voltage V0 under the resistance-capacitance effect of filter (22). Voltage V0 becomes voltage V1 after the buffer of voltage follower (23). After voltage V1 passes through the voltage-dividing circuit (24), an electrical loop is formed through the reference voltage Vref of the voltage-dividing circuit (24) and IC chip (3) to obtain an electrical signal of corresponding output voltage Vout. The continuous pulse signal Vctl from pulse signal input terminal (21) is continuous and its duty cycle can carry out pulse width modulation (PWM). As shown in FIG. 3, the duty cycle of the continuous pulse signal Vctl is defined as (D/T)×100%, where D denotes the duration over which the voltage signal is at high potential level, and T denotes the cycle time required for the continuous pulse signal Vctl to go through a cycle of high-low potential switch. The higher the duty cycle (i.e. changing the D/T), the higher the resulting voltage V0 after the continuous pulse signal Vctl passes through the filter (22), whereas voltage V1 will vary along with voltage V0. At this time, V0=Vctl×(D/T) and an electrical loop is formed through the reference voltage Vref of the voltage-dividing circuit (24) and IC chip (3) to obtain a corresponding output voltage Vout, which is output to the output voltage terminal (300). As such, when the first port (32) of the IC chip (3) receives a power signal from the input voltage terminal (200), the second port (33) of the IC chip (3) would output a power signal of corresponding output voltage Vout according to the varying pulse signal Vctl inputted, thereby adjusting the system voltage output.

As described above, the present invention performs linear adjustment of output voltage Vout by adjusting the duty cycle of continuous pulse signal Vctl to obtain varying voltage V1, in which R1, R2, R3 and Vref are constant values, and voltage V1 can be adjusted using pulse width modulation (PWM). Thus the Kirchhoff's current law can apply:

$$[(V1-Vref)/R1]+[(Vout-Vref)/R2]=[Vref/R3] \quad (a)$$

Eq. (a) can establish the linear modulation relationship between voltage V1 and voltage Vout and result in output voltage Vout, while the values of voltage V1 are obtained by varying the duty cycle D of continuous pulse signal Vctl. Thus the invention can perform linear modulation of output voltage by using PWM technique to modulate the duty cycle of input pulse signal that allows voltage-dividing circuit (24) to produce an electrical signal with specific output voltage Vout.

Figure 4:
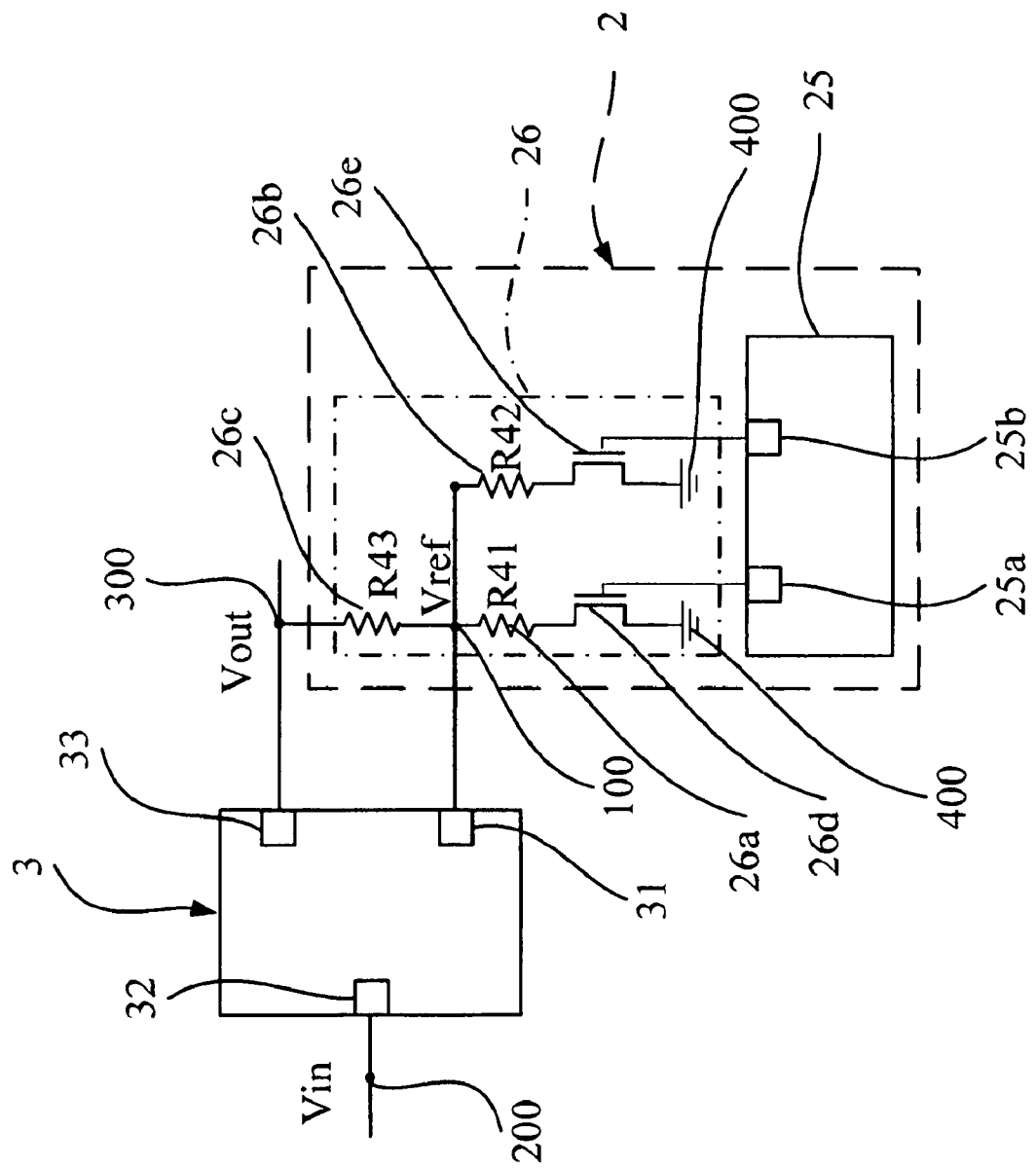
FIG. 4 is a component diagram of the variable voltage regulating device according to another embodiment of the invention.

FIG. 4 is a component diagram of the variable voltage regulating device according to another embodiment of the invention. Referring to FIG. 1 and FIG. 4, another embodiment of the output voltage controller (2) comprises a controller (25) and a voltage-dividing circuit (26). The controller (25) is a control element having a first control terminal (25a) and a second control terminal (25b), where the signal input of the first control terminal (25a) and the second control terminal (25b) is controlled by a microcontroller to achieve the purpose of opening or closing a first switch (26d) and a second switch (26e). The voltage-dividing circuit (26) has a first resistor divider (26a), a second resistor divider (26b), a third resistor divider (26c), a first switch (26d) and a second switch (26e). The first resistor divider (26a), the second resistor divider (26b), and the third resistor divider (26c) are resistors with resistance R41, R42 and R43 respectively. The first switch (26d) and the second switch (26e) are respectively an electronic switch, such as a MOS switch or a transistor switch. The first resistor divider (26a), the first switch (26d) and the ground terminal (400) are in sequence serially and electrically connected, while the second resistor divider (26b), the second switch (26e) and the ground terminal (400) are in sequence serially and electrically connected. The first control terminal (25a) and the second control terminal (25b) are electrically connected to the control terminal of first switch (26d) and second switch (26e) respectively. The other end of the first resistor divider (26a), the other end of the second resistor divider (26b) and one end of the third resistor divider (26c) are simultaneously electrically connected to the reference voltage terminal (100), while the other end of the third resistor divider (26c) is electrically connected to the output voltage terminal (300).

The controller (25) can choose the ON/OFF of the first switch (26d) and the second switch (26e) through the first control terminal (25a) and the second control terminal (25b) respectively, thereby choosing the electrical connection of first resistor divider (26a) and second resistor divider (26b) as well as the equivalent resistance of voltage-dividing circuit (26). Thus after deciding the branch voltages of voltage-dividing circuit (26) through the controller (25), the voltages would form an electrical loop with the electrical signal of reference voltage Vref of reference voltage terminal (100) and enable the output voltage terminal (300) to output a corresponding electrical signal with output voltage Vout.

Similarly, the DC-DC converter (1) (as shown in FIG. 1) can be integrated in the IC chip (3) where the feedback terminal (31) is electrically connected to the reference voltage terminal (100) and provides a fixed voltage for the output of a signal having the same voltage level as reference voltage Vref such that the reference voltage Vref at the reference voltage terminal (100) is a constant voltage. The first port (32) and the second port (33) are electrically connected to the input voltage terminal (200) and the output voltage terminal (300) respectively.

Again referring to FIG. 4, when the controller decides to turn on the first switch (26d) and the second switch (26e) of the voltage-dividing circuit (26) at the same time, the first resistor divider (26a), the second resistor divider (26b) and the third resistor divider (26c) of voltage-dividing circuit (26) form a resistor network, and the following equation can be derived similarly based on the Kirchhoff's current law:

$$Vref[(1/R41)+(1/R42)]=(Vout-Vref)/R43 \quad (b)$$

When the controller (25) chooses to turn on the first switch (26d) of voltage-dividing circuit (26) and turn off its second switch (26e), the first resistor divider (26a) and the third resistor divider (26c) of voltage-dividing circuit (26) would form a resistor network, and the following equation can be derived similarly based on the Kirchhoff's current law:

$$Vref[(1/R41)]=(Vout-Vref)/R43 \quad (c)$$

As illustrated by Eq. (b) and Eq. (c), by controlling the interconnection of the resistor dividers of voltage-dividing circuit (26), the output voltage terminal (300) of the IC chip (3) may be switched to an electrical signal output having a corresponding output voltage Vout, and convert the power signal having an input voltage Vin received by the first port (32) into a power signal having an output voltage Vout.

In addition, the voltage-dividing circuit (26) achieves the control of output voltage Vout through the interconnection of its resistor dividers. Thus those switches may be replaced by a multiplexer where the controller (25) chooses the channel of the multiplexer to achieve the interconnection control of the resistor dividers.

The preferred embodiments of the present invention have been disclosed in the examples. However the examples should not be construed as a limitation on the actual applicable scope of the invention, and as such, all modifications and alterations without departing from the spirits of the invention and appended claims shall remain within the protected scope and claims of the invention.

What is claimed is:

1. A variable voltage regulating device, comprising:
    a DC-DC converter being a direct current voltage converter and containing an input voltage terminal, an output voltage terminal and a reference voltage terminal, the input voltage terminal being used for inputting power, the output voltage terminal being used for outputting power, and the reference voltage terminal being used for providing a steady fixed voltage; and
    an output voltage controller, comprising:
        a pulse signal input terminal for the input of pulse width modulation (PWM) signal;
        a filter for regulating the PWM signal with specific duty cycle fed from the pulse signal input terminal into a signal output with specific voltage;
        a voltage follower containing an operational amplifier, the high-potential end of the operational amplifier being electrically connected to the filter, the low-potential end being electrically connected to the output end of operational amplifier to achieve a state of negative feedback; and
        a voltage-dividing circuit consisting of a first resistor divider, a second resistor divider, and a third resistor divider, one end of the first resistor divider being electrically connected to the output end of the operational amplifier of voltage follower, the other end of the first resistor divider, together with one end of the second resistor divider and one end of the third resistor divider being electrically connected to the reference voltage terminal, the other end of the third resistor divider being electrically connected to a ground terminal, the other end of the second resistor divider being electrically connected to the output voltage terminal.

2. The variable voltage regulating device according to claim 1, wherein the DC-DC converter is integrated in an integrated circuit chip, the integrated circuit chip being an integrated circuit element and comprising a feedback terminal, a first port and a second port, the feedback terminal forming the reference voltage terminal, the first port and the second port forming respectively the input voltage terminal and the output voltage terminal.

3. The variable voltage regulating device according to claim 1, wherein the filter consists of a resistor and a capacitor, one end of the resistor being electrically to the pulse signal input terminal, the other end of the resistor being simultaneously electrically connected to one end of the capacitor and the voltage follower, the other end of the capacitor being electrically connected to the ground terminal.

4. The variable voltage regulating device according to claim 1, wherein the DC-DC converter is a boost regulator, a buck regulator or a boost-buck regulator.

5. The variable voltage regulating device according to claim 1, further comprising a microcontroller, the microcontroller containing a pulse signal output terminal for providing continuous pulse signals to the pulse signal input terminal.

6. A variable voltage regulating device, comprising:
    a DC-DC converter being a direct current voltage converter and containing an input voltage terminal, an output voltage terminal and a reference voltage terminal, the input voltage terminal being used for inputting power, the output voltage terminal being used for outputting power, and the reference voltage terminal being used for providing a steady fixed voltage; and
    an output voltage controller, comprising:
    a controller; and
    a voltage-dividing circuit comprising a channel selection means, a plurality of first branches and at least a second branch, the channel selection means being used for selecting the on or open circuit state of the first branches, the first branches and the second branch being respectively at least electrically and serially connected to a resistor, one end of respective first branches being electrically and serially connected a ground terminal, the other end of the first branches and one end of the second branch being electrically connected to the reference voltage terminal simultaneously, the other end of the second branch being electrically connected to the output voltage terminal;

wherein the reference voltage terminal provides a fixed voltage source, and the controller controls the channel selection means to select the on or open circuit state of respective first branches.

7. The variable voltage regulating device according to claim 6, wherein the channel selection means includes a plurality of switches, each switch being electrically and serially connected to each corresponding first branch, the controller controlling the open/close state of respective switches, thereby selecting the on or open circuit state of the corresponding first branches.

8. The variable voltage regulating device according to claim 7, further comprising a microcontroller, the microcontroller providing signals for the controller to control respective switches.

9. The variable voltage regulating device according to claim 6, wherein the channel selection means include a multiplexer, the multiplexer controlling the on or open circuit state of each corresponding first branch, the controller controlling the multiplexer to select the on or open circuit state of each corresponding first branch.

10. The variable voltage regulating device according to claim 6, wherein the DC/DC converter is integrated in an integrated circuit chip, the integrated circuit chip being an integrated circuit element and comprising a feedback terminal, a first port and a second port, the feedback terminal forming the reference voltage terminal, the first port and the second port forming respectively the input voltage terminal and the output voltage terminal.

11. The variable voltage regulating device according to claim 6, wherein the DC-DC converter is a boost regulator, a buck regulator or a boost-buck regulator.

12. The variable voltage regulating device according to claim 6, wherein the switch is an electronic switch, such as a MOS switch or a transistor switch.

* * * * *